United States Patent [19]

Iwaki et al.

[11] 4,306,184
[45] Dec. 15, 1981

[54] GENERATION CONTROL APPPARATUS FOR VEHICLE GENERATORS

[75] Inventors: Katsutaro Iwaki, Chiryu; Keiichiro Banzai, Toyota; Shigeru Tanaka; Hajime Matsuhashi, both of Kariya, all of Japan

[73] Assignee: Nippondenso Co., Ltd., Kariya, Japan

[21] Appl. No.: 145,503

[22] Filed: Apr. 29, 1980

[30] Foreign Application Priority Data

May 4, 1979 [JP] Japan ................. 54-54861
Jul. 26, 1979 [JP] Japan ................. 54-95680

[51] Int. Cl.³ .......................... H02J 7/14; H02J 7/24
[52] U.S. Cl. ........................ 322/99; 320/48; 320/64; 322/28; 361/20
[58] Field of Search ............... 322/28, 99; 320/64, 320/68, 48

[56] References Cited

U.S. PATENT DOCUMENTS

| | | | |
|---|---|---|---|
| 3,624,482 | 11/1971 | Ruff | 322/99 X |
| 3,656,135 | 4/1972 | Ruff | 322/99 UX |
| 3,710,227 | 1/1973 | Hill | 322/28 X |
| 3,764,879 | 10/1973 | Hill | 320/48 |
| 3,866,106 | 2/1975 | Taguchi et al. | 322/28 X |
| 3,959,708 | 5/1976 | Allport et al. | 322/28 X |
| 4,121,146 | 10/1978 | Hill | 320/64 X |
| 4,143,313 | 6/1979 | Arendt | 322/28 |
| 4,240,023 | 12/1980 | Masutani | 320/48 X |

FOREIGN PATENT DOCUMENTS 2519851 11/1975 Fed. Rep. of Germany ........ 322/99
2607408 8/1977 Fed. Rep. of Germany ........ 322/99

*Primary Examiner*—Robert J. Hickey
*Attorney, Agent, or Firm*—Cushman, Darby & Cushman

[57] ABSTRACT

A generation control apparatus for a vehicle generator detects the output voltage of an excitation current supplying rectifier circuit of the generator. When the output voltage is lower than a predetermined value, a switching element is turned on and a current for operating an indicator lamp is caused to flow through a resistor connected to the switching element, thus detecting a break in the generator circuit.

3 Claims, 7 Drawing Figures

GENERATION CONTROL APPPARATUS FOR VEHICLE GENERATORS

The present invention relates to generation control apparatus for vehicle generators, and more particularly the invention relates to an apparatus capable of detecting and indicating the presence of a break in an excitation circuit extending from a generator excitation winding to the ground by way of a switching element.

Figure 1:
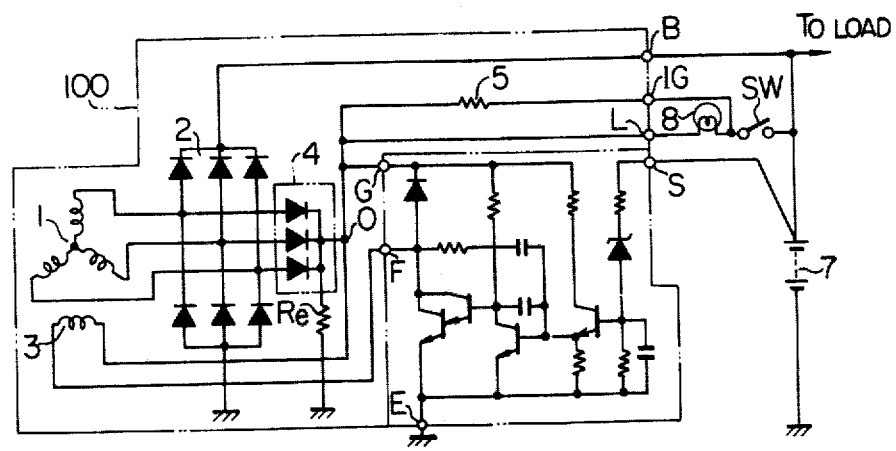
FIG. 1 is a circuit diagram showing a prior art apparatus.

In a known generation control apparatus of the above-mentioned type shown in FIG. 1, a break detecting resistor Re is connected between the output terminal O of a second rectifier circuit 4 and the ground, whereby upon occurrence of a power generation fault due to the breaking fault of the excitation circuit, a current flows from a battery 7 to an energizing circuit including a charge indicator lamp 8, an initial excitation resistor 5 and the resistor Re and the lamp 8 is turned on, thus indicating to the driver that the break has occurred in the excitation circuit.

In the case of this prior art apparatus, if $R_5$ represents the resistance of the initial excitation resistor 5, $R_8$ the resistance value of the lamp 8, Re the resistance value of the break detecting resistor $R_e$ and $E_B$ the terminal voltage of the battery 7, then a voltage $E_L$ applied across the terminals of the lamp 8 is given by $$E_L = E_B \cdot \left( \frac{1}{R_8} + \frac{1}{R_5} \right) \bigg/ \left( Re + \frac{1}{R_8} + \frac{1}{R_5} \right)$$

Thus, if it is desired to set the luminance of the lamp 8 under fault condition to a sufficiently large value, it is necessary to further reduce the resistance value Re, and an experimental result shows that the resistance value Re must be selected about 10 ohms if $R_5 = 30$ ohms $R_8 = 40$ ohms (in the case of 30 watts). In this case, if the generator is generating properly, a voltage of about 15 volts will be applied from the output terminal O so that when there is not break, the power to the break detecting resistor Re amounts to about $V_L^2/Re \div 15 \times 15/10 = 22.5$ W ($V_L$ is the output voltage under generating condition) and consequently the resistor Re must be greatly increased in size and shape so as to ensure a large power capacity, thus increasingly restricting its mounting to generators and also increasing its heat generation and thereby making it necessary to provide a thermal protective device or the like.

Another disadvantage is that since the break detecting resistor Re is always connected as an electric load of the second rectifier circuit 4, large capacity elements must be used for the diodes forming the second rectifier circuit 4 and the effective output current that can be taken from the generator will be decreased by an amount corresponding to the current flow to the resistor Re.

With a view to overcoming the foregoing deficiencies in the prior art, it is the object of the present invention to provide an improved generation control apparatus for vehicle generators which is so designed that the occurrence of a fault, such as, a break in the excitation circuit of a generator is indicated to the driver by a charge indicator means, that the consumption of power by an energizing resistor for driving the indicator means is reduced as far as possible under normal generating condition, that the power capacity of the energizing resistor is made much smaller than previously and it is also reduced in size and shape making the use of integrated circuits advantageous, and that the output of a second rectifier circuit is almost exclusively used for excitation purposes under normal generating condition with the resulting increase in the generated output.

In accordance with the present invention there is thus provided a generation control apparatus for a vehicle generator comprising a series circuit including an energizing circuit forming resistor and switching means and connected between the output terminal of a second rectifier circuit of a vehicle generator and the ground, and a circuit responsive to the voltage at the output terminal of the second rectifier circuit to always monitor the generating condition of the generator, whereby when at least the occurrence of a generation fault or the like is detected by the monitoring circuit, the switching means is turned on and a current path is formed including a battery, a key switch, indicating means and the energizing resistor, thus actuating the indicating means and thereby positively indicating to the driver the occurrence of the faulty generation of the generator, particularly the break in the generator excitation circuit.

In accordance with another preferred embodiment of the invention, the apparatus further performs an overvoltage preventing function which forces the generator to stop generating when its output voltage exceeds a predetermined value, whereby when an overvoltage occurs, the generation of power is quickly controlled so as to protect the various components and the occurrence of the overvoltage is indicated to the driver by using the common indicating means.

The present invention will now be described in greater detail with reference to the illustrated embodiments.

Figure 2:
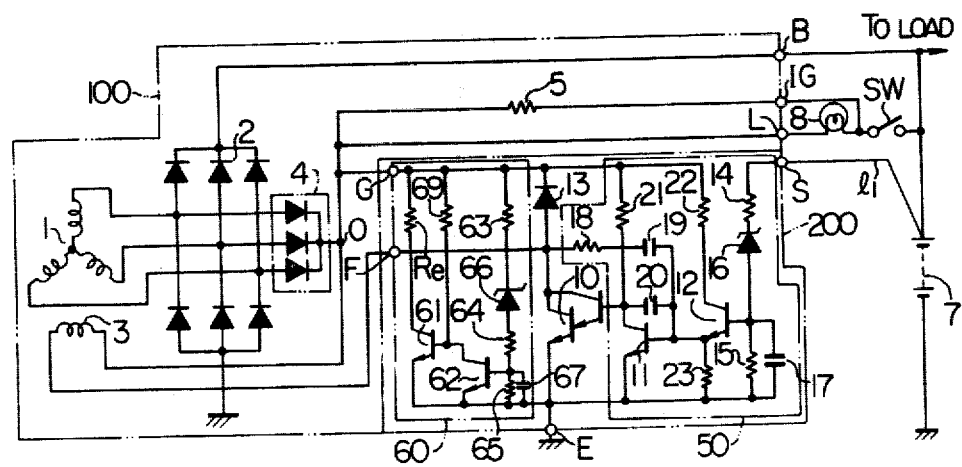
FIG. 2 is a circuit diagram showing a first embodiment of a control apparatus according to the invention.

Referring first to FIG. 2 showing a first embodiment of the apparatus according to the invention, numeral 100 designates a three-phase AC generator properly driven from the engine installed in a vehicle, and it comprises armature windings 1, a first rectifier circuit 2 including a three-phase full-wave rectifier, a field or excitation winding 3, a second rectifier circuit 4 including excitation current supplying diodes and an initial excitation resistor 5. Numeral 200 designates a block of a generation control apparatus comprising mainly a voltage regulating circuit for regulating the generated voltage to a predetermined value, and a break detecting circuit 60 for detecting a break in the excitation circuit which constitutes a principal part of the invention. Numeral 7 designates a vehicle battery, 8 a charge indicator lamp for charge indicating purposes, and SW a key switch which usually includes the engine ignition switch.

The voltage regulating circuit comprises Darlington-connected transistors 10 forming switching elements for providing an excitation circuit extending from the output terminal O of the second rectifying circuit 4 to the transistors 10 through the excitation winding 3, control transistors 11 and 12, a counter electromotive force absorbing diode 13, a battery terminal voltage detecting circuit including voltage dividing resistors 14 and 15, a Zener diode 16 and a smoothing capacitor 17, a resistor 18 and a capacitor 19 forming a positive feedback circuit, an operation stabilizing capacitor 20, and resistors 21 and 22.

In the Figure, symbol S designates an input terminal for detecting the battery terminal voltage, F an excitation output terminal, G an excitation power supply input terminal, B a charging output terminal, L a lamp drive terminal, and IG an initial excitation input terminal.

Next, the operation of the voltage regulating circuit will be described. When the key switch SW is closed, the generator 100 is not generating as yet so that no voltage appears at the output terminal O of the second rectifier circuit 4 and a current flows from the battery 7 to the control circuit through the lamp 8 and the initial excitation resistor 5 turning the transistors 10 on. Then, at the instant that the lamp 8 is turned on the excitation winding 3 is energized initially. Thereafter, the engine is started so that the generator starts generating and eventually the second rectifier circuit 4 generates a voltage substantially equal to the terminal voltage of the battery 7. When this occurs, the potential difference across the lamp 8 decreases and the lamp 8 is turned off. When the generated voltage increases further so that the battery voltage is increased by the charging operation and eventually exceeds a predetermined value, the Zener diode 16 is turned on and the transistor 12 is turned on. Thus the transistor 11 is turned on and the transistor 10 are turned off thereby interrupting the current supply and energization of the excitation winding 3. As a result, the generated voltage starts to decrease and the battery voltage becomes lower than the predetermined value. When this occurs, the Zener diode 16 is turned off and the transistors 11 and 12 are turned off. Thus the transistors 10 are turned on restarting the supply of current and energization of the excitation winding 3. Thereafter, the above-described operation is performed repeatedly and the terminal voltage of the battery 7 is regulated to the predetermined value (usually 14 to 15 volts) determined by the Zener voltage, etc.

The principal part of the invention or the break detecting circuit 60 comprises transistors 61 and 62, a detection circuit for detecting the voltage at the output terminal O of the second rectifier circuit 4 which includes resistors 63, 64 and 65, a Zener diode 66 and a delay capacitor 67, a break detecting and lamp driving energization resistor Re and a resistor 69.

The operation of the break detecting circuit 60 will now be described. With the excitation circuit operating properly, the detecting circuit 60 operates as follows. When the key switch SW is closed, the voltage at the output terminal O of the second rectifier circuit 4 has a divisional voltage value produced by the combined resistance of the parallel circuit comprising the initial excitation resistor 5 and the lamp 8 and the resistance of the excitation winding 3. Since the resistance of the excitation winding 3 is usually on the order of 3 to 4 ohms, the voltage at the output terminal O is decreased so that the Zener diode 66 is not turned on, the transistor 62 is turned off and the transistor 61 is turned on. Thus the circuit provided by the resistor Re is connected in parallel with the series circuit including the excitation winding 3 and the voltage at the output terminal O is decreased correspondingly. In this condition, when the generator 100 comes into operation and starts generating, the voltage at the output terminal O is increased up to about the battery voltage. In this case, the lamp 8 is turned off as mentioned previously. On the other hand, it is so arranged that both the Zener diode 66 and the transistor 62 are turned on and the transistor 61 is turned off preventing energization of the resistor Re whose resistance value is very small. In this way, in the normal condition the consumption of power by the break detecting circuit 60 is minimized.

If the excitation circuit becomes open due to a break caused by any contact fault of the connectors or any fault of the excitation winding 3 or the transistors 10 themselves which are included in the excitation circuit, the break detecting circuit 60 operates as follows. When the key switch SW is closed, the battery voltage is momentarily applied to the output terminal O. In this case, the circuit constants are selected so that the transistor 61 is turned on first and the voltage at the output terminal O is decreased to a predetermined divisional voltage value, thus forcibly turning the Zener diode 66 and the transistor 62 off. As a result, a current flows from the battery 7 through the lamp 8, the resistors 5 and Re and the transistor 61 and the lamp 8 is turned on. In this case, the voltage at the output terminal O becomes slightly high as compared with that obtained when the excitation circuit is functioning properly. Thereafter, even if the engine is started so that the generator comes into operation, no generated voltage appears with the result that the Zener diode 66 is kept off and the transistor 61 is held on. Thus, despite the starting of the enging, the lamp 8 is held on and the driver is alerted to the fault condition in the generator.

The capacitor 67 serves as a delay capacitor so that if the key switch SW is closed with a fault in the excitation circuit, the transistor 62 is positively prevented from being turned on prior to the transistor 61. However, the experiment conducted by the inventors, has shown that if switably selected transistors are used, the apparatus will function properly without using this capacitor.

The experiment by the inventors has also shown that in accordance with the present invention, by selecting the resistance value of the break detecting and lamp driving energization resistor Re between 5 and 10 ohms, it is possible to reduce the power consumption of the resistor Re to zero watt at the normal generating condition and even under faulty condition to 1.5 to 2 watts which will be less than one tenth of the power consumption of the prior art apparatus amounting to about 22 to 23 watts.

Figure 3:
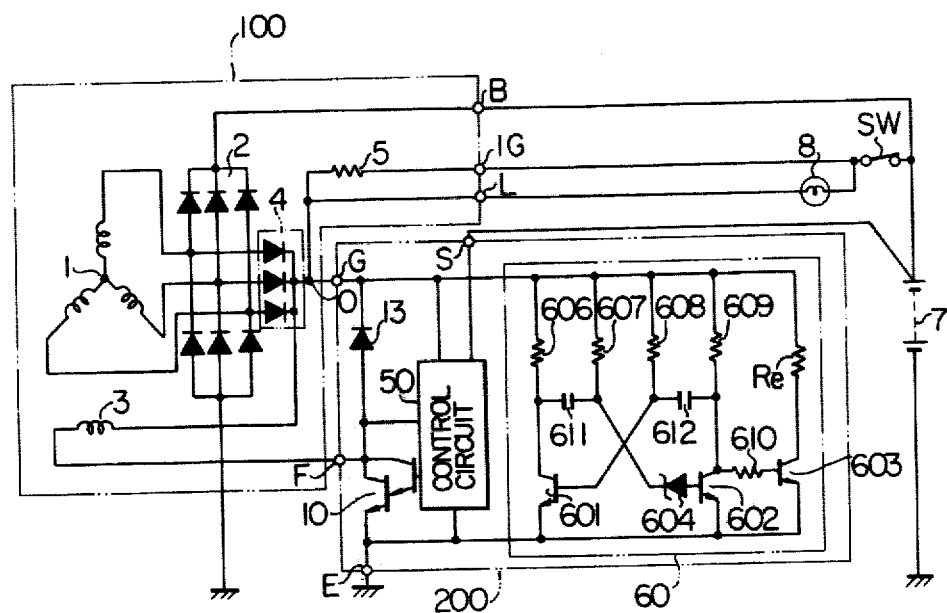
FIG. 3 is a circuit diagram showing a second embodiment of the apparatus according to the invention.

Referring now to FIG. 3, there is illustrated a second embodiment of the invention. In the case of the above-described first embodiment, if the excitation circuit is opened due to a break while the generator is generating power, due to the fact that the Zener diode 66 and the transistor 62 have been kept on until the opening of the circuit, even if the battery voltage is momentarily applied in place of the generated voltage to the output terminal O, the transistor 61 and 62 will not change state and at that time the lamp 8 will not be turned on. (Of course, if the key switch SW is opened and then it is closed again, the lamp 8 will be continuously turned on as mentioned previously.) This drawback is overcome by the second embodiment which is designed so that when a break occurs while the generator is generating power, the lamp is readily turned on to alert the driver to the faulty condition.

The second embodiment will now be described in detail. The circuit construction of the second embodiment excluding its break detecting circuit 60, particularly the construction of the control circuit 50 is identical with the counterpart of the first embodiment shown in FIG. 2 and will not be described. The break detecting circuit 60 comprises mainly a generation detecting circuit for detecting the operating condition of a generator and a drive circuit for operating the lamp 8 upon occurrence of a fault. The generation detecting circuit comprises transistors 601 and 602, a Zener diode 604, resistors 606 to 609 and capacitors 611 and 612 and the circuit forms an oscillator circuit including an astable multivibrator. The drive circuit comprises a transistor 603, a break detecting and lamp driving energization resistor Re and a base resistor 610.

The operation of the break detecting circuit 60 will now be described. With the excitation circuit functioning properly, if the key switch SW is closed, the transistors 10 are turned on and the voltage at the output terminal O of the second rectifier circuit 4 is reduced to a predetermined divisional voltage value which is lower than the battery voltage. Thus, due to the circuit setting of the oscillator circuit, the Zener diode 604 is not turned on and the oscillator circuit is not brought into oscillation. As the transistor 603 is in the on state. Of course, the lamp 8 is lighting. In this condition, as the engine is started so that the resulting generated voltage rises up to about the battery voltage, the lamp 8 is turned off. In this case, a sufficient voltage is supplied to the oscillator circuit from the second rectifier circuit 4 so that the Zener diode 604 is turned on and the oscillator circuit starts oscillating causing the transistor 603 to be alternately turned on and off at its oscillation period. In this case, it is so designed that be decreasing the duty cycle during the on period of the transistor 603, the substantial power consumption of the resistor Re can be reduced as far as possible.

Assuming that the generator 100 stops generating due to the occurrence for example of a break in the excitation winding 3 or the transistors 10 in the excitation circuit, no predetermined voltage is generated at the output terminal O of the second rectifier circuit 4. In this case, although the oscillator circuit tends to continue oscillating by virtue of the voltage supplied from the battery 7 through the key switch SW and the parallel circuit of the lamp 8 and the initial excitation winding 5, at the instant that the transistor 603 is turned on the voltage at the output terminal O is reduced substantially to a value derived by dividing the battery voltage by the parallel resistance of the lamp 8 and the initial excitation resistor 5 and the break detecting resistor Re. This decreased voltage at the output terminal O is such that the Zener diode 604 in the oscillator circuit is not turned on and the oscillator circuit stops oscillating with the transistor 602 being turned off and the transistor 601 on. As a result, the transistor 603 is held on and the lamp 8 is turned on by the battery 7 through the path including the key switch SW, the lamp 8 and the resistor Re readily alerting the driver to the fault condition of the generator.

Of course, if the key switch SW is opened and it is closed again, even after the starting of the engine the transistor 603 will still be held on and the lamp 8 will also be held on thus advising the driver of the generation fault.

The experiment conducted by the inventors has shown that even if the energization resistor Re is selected between 5 and 10 ohms, by selecting the duty cycle of the oscillator circuit during the on period of the transistor 603 between 1/50 and 1/100, it is possible to reduce the power consumption of the resistor Re to 0.2 to 0.3 watts at the normal generating condition and to 2 to 3 watts under fault condition, thus reducing the power consumption to less than one tenth of that of the prior art apparatus.

Figure 4:
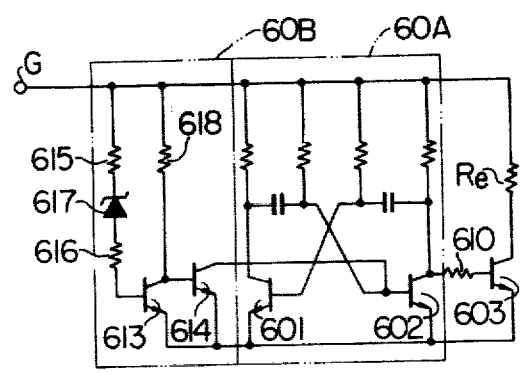
FIG. 4 is a circuit diagram showing a principal part of the apparatus according to a third embodiment of the invention.

While, in the embodiment shown in FIG. 3, the oscillation controlling Zener diode 604 is connected in the base current path of the oscillator circuit, as in the case of the third embodiment shown in FIG. 4, a separate voltage detecting circuit 60B may be provided in addition to an oscillator circuit 60A, and the circuit 60B may be composed of transistors 613 and 614, resistors 615, 616 and 618 and a Zener diode 617. In this way, only when the voltage at the output terminal O is higher than a predetermined value, the Zener diode 617 and the transistor 613 are turned on and the transistor 614 is turned off, thus causing the oscillator circuit 60A to oscillate. In any other condition, the transistor 614 is turned on and the oscillation is stopped.

Further, with the embodiment of FIG. 3, the same function may be ensured by eliminating the resistors Re and 610 and the transistor 603 and causing the resistor 606 and the transistor 601 in the oscillator circuit to respectively perform the roles of the resistor Re and the transistor 606.

Further, while, in the embodiments of FIGS. 3 and 4, the oscillator circuit comprises an astable multivibrator, the same function may be served by any other type of oscillator circuit such as a sinusoidal oscillator circuit or sawtooth oscillator circuit.

Further, while the voltage at the output terminal O is detected by the generation detecting circuit mainly comprising the Zener diode and the resistors, the voltage may be detected by means of the ordinary comparator.

Further, while, in the embodiments described above, the transistor 61 or 603 is used to change the connection of the energization resistor Re, any other switching element such as a thyristor may be equally be used.

Figure 5:
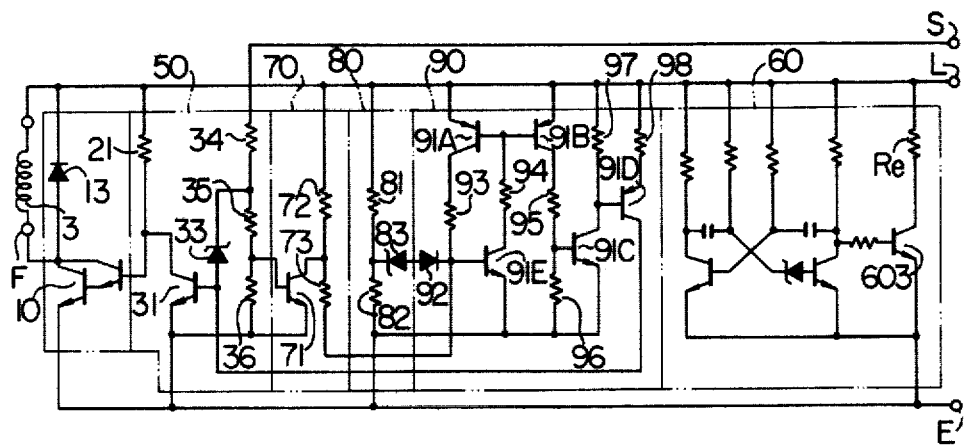
FIG. 5 is a circuit diagram showing a fourth embodiment of the apparatus according to the invention.

FIG. 5 shows a fourth embodiment of the generation control apparatus which performs the functions of detecting a break in a path including the terminal S and the open condition of the generator output terminal B in addition to the function of the embodiment shown in FIG. 3. Only those portions of the fourth embodiment which are different from FIG. 3 will be described. A control circuit 50 which is simplified as compared with FIG. 3 includes resistors 34 to 36 for dividing the battery voltage applied through the terminal S and a Zener diode 33, whereby when the voltage at the terminal S exceeds a predetermined value, the Zener diode 33 is turned on so that a control transistor 31 is turned on and Darlington-connected transistors 10 are turned off. An S terminal path break detecting circuit 70 comprises a transistor 71 and resistors 72 and 73 and it is adapted to actuate a hold circuit 90 when the terminal S is opened due to a break. A generator voltage detecting circuit 80 comprises resistors 81 and 82 and a Zener diode 83, whereby when the generator output voltage exceeds a predetermined value, the Zener diode 83 is turned on and a signal is applied to the hold circuit 90.

The hold circuit 90 comprises transistors 91A to 91E, a diode 92 and resistors 93 to 98, whereby when a signal is received from the generator voltage detecting circuit 80, the control transistor 31 is turned on and the transistors 10 are turned off. When the circuit is placed in the holding condition, this condition is not released until the key switch is turned off. The circuit 60 will not be described.

Next, the generation stopping function and the warning function upon occurrence of a break in the charging line between the generator output terminal and the battery terminal will be described.

If the generator output terminal becomes open, the generator output voltage or the B terminal voltage and the L terminal voltage are increased momentarily so that the Zener diode 83 is turned on through the resistors 81 and 82 which divide the L terminal voltage. Thus, the transistor 91E is turned on and the hold circuit 90 comes into operation. In other words, when the transistor 91E is turned on, the transistors 91A and 91B are turned on and the on state of the transistor 91E is held. On the other hand, when the transistor 91B is turned on so that the transistors 91C and 91D are turned on, the control transistor 31 is turned on and the output stage transistors 10 are forcibly turned off causing the generator to stop generating. When the generation of power is stopped, the potential of the L terminal voltage is decreased so that in the circuit 60 the transistor 603 is turned on and the terminal L is grounded through the resistor Re and the transistor 603. Thus, the L terminal voltage is decreased to a predetermined divisional voltage value and the lamp 8 is turned on thus giving a warning to the driver. This warning is continued until the key switch is turned off.

Next, the generator generation indication and warning functions upon opening of the terminal S or the occurrence of a break in the battery voltage detection line of FIG. 5 (the line l₁ of FIG. 2) will be described.

When a break occurs in the battery voltage detecting line so that the terminal S is opened, no voltage is applied to the base of the transistor 71 of the S terminal path break detecting circuit 70 and the transistor 71 is turned off. Thus, a base current flows to the transistor 91E through the resistors 72 and 73. When this occurs, the hold circuit 90 comes into operation so that the transistor 91D is held on and the transistor 31 is turned on. Thus, the output stage transistors 10 are turned off and the generation of power is stopped. When the generation is stopped, as mentioned previously, the warning circuit 60 comes into operation so that the lamp 8 is turned on and a warning is given to the driver. With this circuit, the warning is kept until the key switch SW is turned off.

Figure 6:
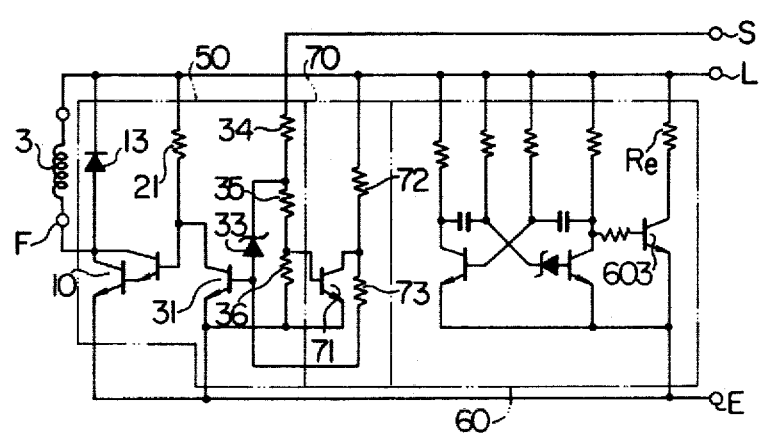
FIG. 6 is a circuit diagram showing a fifth embodiment of the apparatus according to the invention.

FIG. 6 shows a fifth embodiment of the invention which combines the functions of indicating the occurrence of a break in the excitation circuit (the excitation winding 3 and the transistors 10) and of stopping the generation and indicating the same upon occurrence of a break in the battery voltage detection line. The fifth embodiment differs from the fourth embodiment of FIG. 5 in that the hold circuit 90 is eliminated so that in particular, when the battery voltage detecting line which has been disconnected is again connected properly, the generation of power is started simultaneously and the holding of warning is eliminated. The circuits of the fifth embodiment operate in the same manner as the circuits of FIG. 5 and will not be described.

Figure 7:
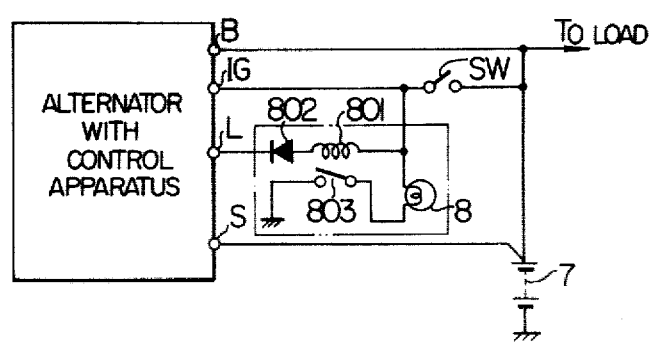
FIG. 7 is a circuit diagram showing a principal part of the apparatus according to a sixth embodiment of the invention.

Further, while, in the above-described embodiments, the indicating means 8 comprises a lamp directly connected in series circuit relation between the key switch SW and the terminal L, the lamp constituting the indicating means may be replaced for example by a relay coil 81 and a reverse current blocking diode 802 which are arranged as shown in FIG. 7 so as to operate the lamp 8 in response to the opening and closing of relay contacts 803 for the relay coil 801. Of course, this mechanical type relay may be replaced with a semiconductor type relay so as to operate the lamp. Also, in this case the lamp may be replaced with a light-emitting diode or any other warning element such as a buzzer.

It will thus be seen from the foregoing description that in accordance with the apparatus of this invention, a voltage regulating circuit of the same kind as heretofore known in the art may be provided with a warning circuit or any other protective circuits and that these circuits may be provided in the form of an integrated circuit apparatus constructed by thick-film or thin-film techniques, with the result that the integrated circuit apparatus includes only the same number of input and output terminals as used in the prior art voltage regulating circuit along (i.e., the terminals L, F, S and E) and the apparatus is reduced in size and shape to about the same extent as the prior art apparatus, thus making it possible to mount the apparatus interchangeably with the generation control apparatus which are now in use.

We claim:

1. A generation control apparatus for a vehicle generator having a first rectifier circuit for supplying power to loads including a battery, and a second rectifier circuit for supplying an excitation current to an excitation coil, comprising:
   a voltage regulator circuit connected to said excitation coil and said battery and operable in response to the closing of a key switch to control the excitation current to said excitation coil in accordance with an output voltage of said battery and thereby to control an output voltage of said generator;
   indicator means connected to an output terminal of said second rectifier circuit; and
   an indicator drive circuit connected to the output terminal of said second rectifier circuit, said drive circuit including a detecting circuit for detecting a voltage at said output terminal, a resistor connected to said output terminal, and a switching circuit connected to said detecting circuit and said resistor and operable when the voltage at said output terminal is lower than a predetermined value so as to cause an energization current for said indicator means to flow through said resistor.

2. A generation control apparatus according to claim 1, further comprising:
   a first protective circuit for detecting a voltage on a line interconnecting said battery and said voltage regulating circuit to operate said voltage regulating circuit so as to cut off said excitation current when the voltage on said interconnecting line is higher than a predetermined value, and
   a second protective circuit connected to said voltage regulating circuit for detecting a voltage on a second line interconnecting said indicator means and said second rectifier circuit to operate said voltage regulating circuit so as to cut off said excitation current when the voltage on said second interconnecting line is higher than a predetermined value.

3. A generation control apparatus according to claim 1, wherein said detecting circuit includes an astable multivibrator, and a Zener diode for controlling the interruption of operation of said multivibrator.

* * * * *